(12) United States Patent
Sukup

(10) Patent No.: US 8,684,801 B2
(45) Date of Patent: Apr. 1, 2014

(54) VENT FOR A GRAIN BIN

(75) Inventor: Eugene G. Sukup, Hampton, IA (US)

(73) Assignee: Sukup Manufacturing Company, Sheffield, IA (US)

( * ) Notice: Subject to any disclaimer, the term of this patent is extended or adjusted under 35 U.S.C. 154(b) by 427 days.

(21) Appl. No.: 12/609,249

(22) Filed: Oct. 30, 2009

(65) Prior Publication Data

US 2010/0124877 A1 May 20, 2010

Related U.S. Application Data

(60) Provisional application No. 61/115,308, filed on Nov. 17, 2008.

(51) Int. Cl.
*E04H 7/00* (2006.01)

(52) U.S. Cl.
USPC .............................. 454/174; 52/82

(58) Field of Classification Search
USPC ....................................... 454/174
See application file for complete search history.

(56) References Cited

U.S. PATENT DOCUMENTS

| | | |
|---|---|---|
| 1,977,391 A | 10/1934 | Kramer |
| 1,981,417 A | 11/1934 | Kreutzer |
| 2,509,016 A * | 5/1950 | Peterson ............... 454/279 |
| 3,280,473 A | 10/1966 | Sullivan |
| 3,433,044 A * | 3/1969 | Kurz et al. .............. 72/186 |
| 4,480,534 A | 11/1984 | Sloan |
| 4,867,046 A | 9/1989 | Yoder |
| 5,344,363 A | 9/1994 | Pollock |
| 2005/0048903 A1 * | 3/2005 | McGhie ............... 454/118 |

OTHER PUBLICATIONS

Westeel, Wide Corr Grain Bins Farm Series Installation Instructions, Manual No. 198862-p. 10, Apr. 1, 2007; Westeel Division of Vicwest Operating Limited Partnership, Canada.
Brock Grain & Feed Systems—A Division of CTB, Inc.; Brock Eave-Vent; BR-1558/1098; US.

* cited by examiner

*Primary Examiner* — Steven B McAllister
*Assistant Examiner* — Helena Kosanovic
(74) *Attorney, Agent, or Firm* — Zarley Law Firm, P.L.C.

(57) ABSTRACT

A grain bin assembly wherein the grain bin has a corrugated cylindrical wall and a roof structure having a plurality of triangular roof panels. The plurality of roof panels have rib junctions which form a gap. A vent assembly is positioned between the corrugated cylindrical wall and the roof structure. The vent assembly has a plurality of louvers positioned within the vent assembly. The vent assembly provides improved venting of the grain bin assembly.

14 Claims, 4 Drawing Sheets

VENT FOR A GRAIN BIN

CROSS REFERENCE TO RELATED APPLICATION

This application claims the benefit of U.S. Provisional Application No. 61/115,308 filed Nov. 17, 2008.

BACKGROUND OF THE INVENTION

This invention is directed toward a vent for use with a grain bin such as a bin for drying grain or storage. Typically, a grain bin is equipped with a means to facilitate air flow through an enclosure to provide an appropriate moisture level, prevent the build up of dust particles within the bin, and prevent precipitation, debris and birds from entering the bin. Particularly with drying bins the vent provides an exhaust for the large volume of air used.

Roof vents in the form of capped or covered apertures cut into the roof of the structure have been used to perform these functions. Roof vents of this type do not always create effective air flow within the storage enclosure and are difficult to seal. This type of vent requires additional time to install, requires cutting openings in the roof, and they are susceptible to wind and ice damage. Another type of vent system is disclosed in U.S. Pat. No. 4,867,046 to Yoder. The Yoder system comprises a plurality of brackets or brace members that raise the roof structure of a bin a distance above a wall enclosure to create a series of air vents therebetween. To prevent debris and birds from entering the bin a screen mesh is connected to and extends between the brace members. While this system may improve air circulation, the system is comprised of many parts, is difficult and expensive to manufacture, and is time consuming and difficult to install. Therefore, there exists a need in the art for a vent that addresses these deficiencies.

BRIEF SUMMARY OF THE INVENTION

A grain bin assembly wherein the grain bin has a corrugated cylindrical wall and a roof structure having a plurality of triangular roof panels. The plurality of roof panels have rib junctions which form a gap. A vent assembly is positioned between the corrugated cylindrical wall and the roof structure. The vent assembly has a plurality of louvers positioned within the vent assembly. The vent assembly provides improved venting of the grain bin assembly.

DETAILED DESCRIPTION

Figure 1:
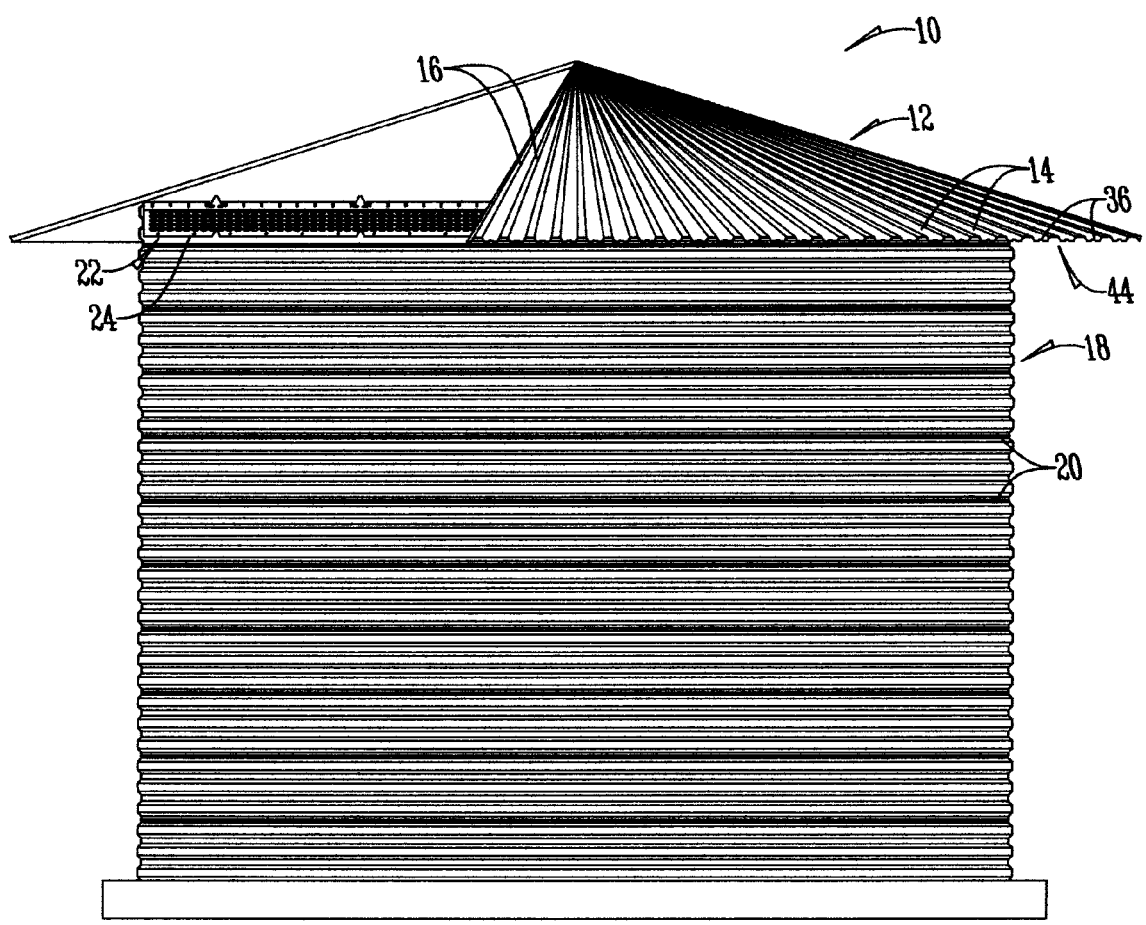
FIG. 1 is a perspective view of a grain bin assembly having a vent assembly.
Figure 2:
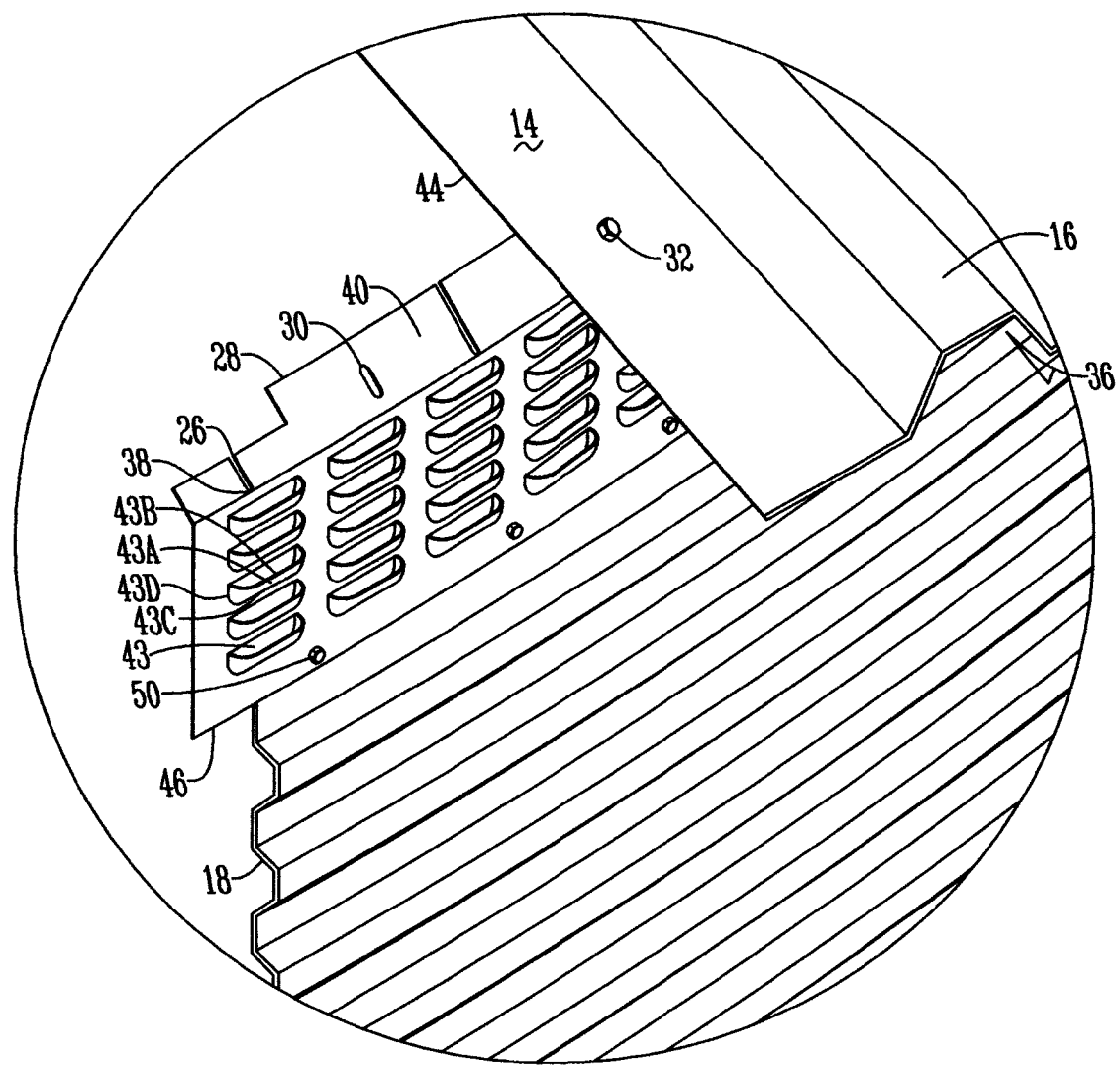
FIG. 2 is a perspective view of a grain bin assembly having a vent assembly.
Figure 3:
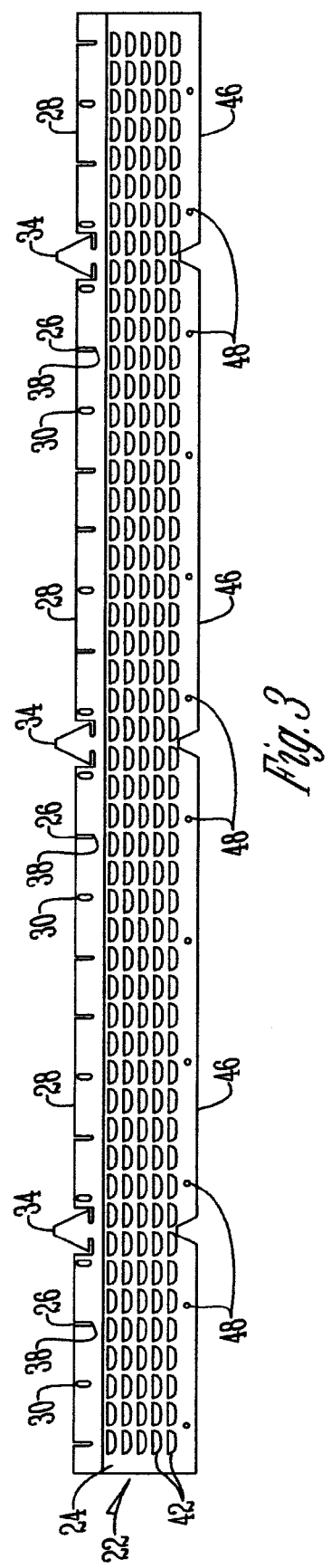
FIG. 3 is a plan view of a vent assembly.
Figure 4:
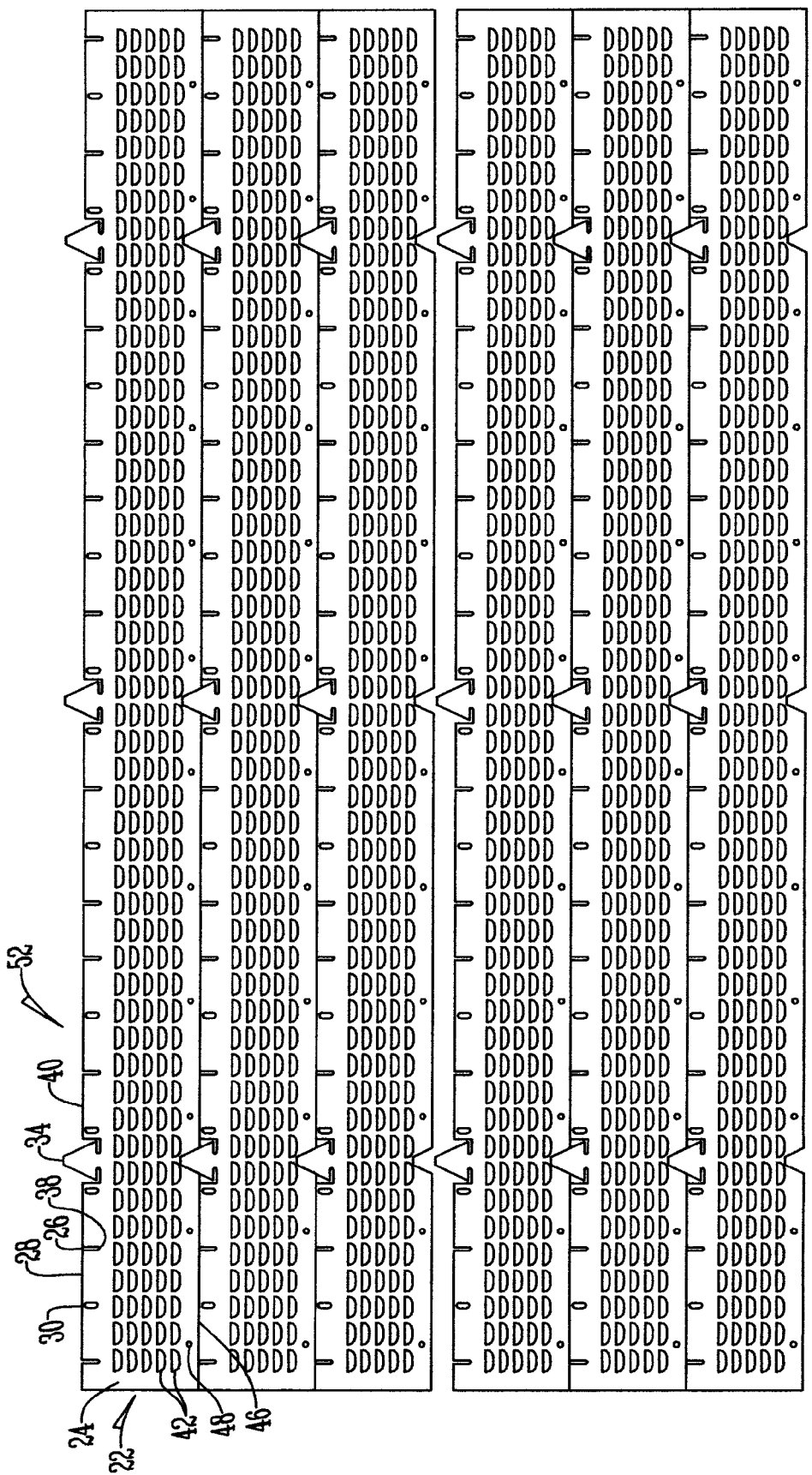
FIG. 4 is a plan view of a plurality of vent assemblies formed out of a single piece of sheet metal.

A conventional grain drying bin 10 has a roof structure 12 having triangular roof panels 14 joined together at rib junctions 16. The bin 10 also has a cylindrical wall 18 generally formed from corrugated metal panels 20. Mounted between the roof structure 12 and the wall 18 is a vent assembly 22 comprised of a plurality of elongated vent members 24.

The elongated members 24 have a plurality of transverse slots 26 cut into the top edge 28 which permit the elongated member 24 to bend without crimping. Positioned in-between the slots 26 are a plurality of apertures 30 that receive a bolt 32 for attaching the elongated member 24 to the roof structure 12. Cut into the top edge 28 and extending outwardly from the top edge 28 are a plurality of triangular shaped members 34. The triangular shaped members 34 are positioned to align with the rib junctions 16 and are bent in relation to the elongated member 24 to fill a gap 36 created by the rib junction 16 to prevent debris and birds from entering the bin 10. The top 28 of the elongated member 24 is bent at approximately the inward end 38 of the slots 26 to form a flange 40 to align with the angle of the roof 12 and facilitate mounting the elongated member 24 to the roof structure 12.

Below the flange 40, on the elongated member 24, are a plurality of openings 42. Preferably, the openings 42 are louvers that are positioned such that the opening 42 faces upward or toward the flange 40. By positioning the louver 42 in this manner, grain will not leak out should the bin be filled to the level of the vent 24. Alternatively, some or all of the louvers 42 may face downward, or at an angle. The louvers or openings 42 permit air to flow in and out of the bin 10, while the overhang 44 of the roof structure 12 and the louvers 42 keep precipitation, debris and birds out.

In one embodiment, louvers 42 are formed by cutting a slit 43 in the elongated vent members 24 and depressing the louver body 43a away from the vent member 24 to create a mouth 43b. Pressing the louver body 43a away from the vent member 24 creates an angled bend in the base 43c and sides 43d which connects the louver body 43a to the elongated vent member 24.

On the bottom 46 of the elongated member 24 are a plurality of apertures 48 that receive bolts 50 to attach the elongated member 24 to the wall 18. The apertures 30, 48 on the flange 40 and at the bottom 46 of the elongated member 24 allow for easy and faster installation during erection of the vent 24 to the roof 12 structure and the wall 18 than existing vents.

A plurality of elongated members 24 may be cut from a single sheet of metal 52 which saves material and reduces the number of parts and the cost. The advantages of the vent 24 over the prior art are that there are fewer parts, the vent costs less to manufacture, takes less time to install, and eliminates obstructions on the roof 12 where snow and debris can accumulate.

From the above discussion it will be appreciated that the vent for a grain bin presented provides an improved venting assembly which improves air flow through a grain bin, comprises fewer parts than the prior art, is easier to install than prior art vents and is less expensive. Accordingly, the vent for a grain bin provides and offers many advantages over the prior art. It will be appreciated by those skilled in the art that other various modifications could be made to the device without parting from the spirit and scope of this invention. All such modifications and changes fall within the scope of the claims and are intended to be covered thereby.

What is claimed:

1. A grain bin assembly comprising:
   an exterior corrugated cylindrical wall, a roof having roof panels;
   each elongated vent member formed of a single sheet of metal positioned between the exterior corrugated cylindrical wall and the roof wherein the elongated members have a plurality of slots cut into a top edge such that the top edge is bent at approximately an inner end of the slots to form a flange between the slots for mounting the elongated member to the roof structure;

the vent assembly having a plurality of louvers each facing upward forward positioned therein to permit air to flow in and out of the grain bin such that grain filled to the level of the vent assembly is prevented from leaking out of the vent assembly.

2. The grain bin assembly of claim 1 wherein a bottom edge of the vent assembly is attached to the exterior corrugated cylindrical wall and a top edge of the vent assembly is mounted to the roof of the grain bin and each of the louvers have an opening which faces upward toward the top edge of the vent assembly.

3. The grain bin assembly of claim 1 wherein the vent assembly has a plurality of members.

4. The grain bin assembly of claim 1 wherein the flanges have at least one aperture for receiving a bolt so as to facilitate mounting to the roof.

5. The grain bin assembly of claim 1 wherein the roof has an overhang portion which protects the louvers.

6. The grain bin assembly of claim 1 wherein each of the louvers have a base connected to the vent assembly, a louver body which is bent outwardly from the vent assembly, and an open mouth opposite the base facing upward toward a top edge of the vent assembly and the roof of the grain bin.

7. A grain bin assembly comprising:
a cylindrical wall;
a roof having roof panels and rib junctions which form a gap;
a vent assembly including a plurality of elongated vent members formed of a single sheet of metal positioned between the corrugated cylindrical wall and the roof wherein the elongated members have a plurality of slots cut into a top edge such that the top edge is bent at approximately an inner end of the slots to form a flange between the slots for mounting the elongated member to the roof structure;
the vent assembly having a plurality of members positioned within the gap of a rib junction;
wherein each elongated vent member includes a plurality of louvers; and
wherein each louver includes a base, a louver body, and an open mouth which is opposite the base and faces upward toward a top edge of the elongated vent member and the roof of a grain bin.

8. The grain bin assembly of claim 7 wherein the members are triangular in shape.

9. A grain bin vent comprising:
a plurality of elongated vent members formed of a single sheet of metal and each elongated vent member having a top edge and a bottom edge, wherein the elongated vent members are defined at least partly by notch in the bottom edge on the single sheet of metal;
a plurality of openings positioned within the vent elongated members;
a plurality of members extending beyond the top edge of the elongated vent members;
a plurality of slots cut into a top edge of the elongated vent member such that the top edge is bent at approximately an inner end of the slots to form a flange between the slots for mounting the elongated member to the roof structure;
wherein each of the plurality of elongated vent members includes a plurality of louvers each covering one of the plurality of openings;
wherein each louver includes a louver base connected to the elongated vent member, a louver body bent outwardly from the elongated vent member, and an open mouth opposite the base such that the open mouth faces upward and outward toward the top edge of the elongated vent member.

10. The grain bin assembly of claim 1 wherein the vent assembly connects at its bottom edge to the corrugated cylindrical wall.

11. The grain bin assembly of claim 1 wherein the roof has an overhang which extends to the bottom of the vent assembly.

12. The grain bin assembly of claim 10 wherein when a member is positioned within a gap of a rib junction, debris and birds are prevented from entering the grain bin.

13. The grain bin assembly of claim 7 wherein the vent assembly is formed of a unitary member.

14. The grain bin assembly of claim 7 wherein each louver includes side edges such that the side edges and the louver base connect each louver body to the elongated vent member.

* * * * *

UNITED STATES PATENT AND TRADEMARK OFFICE
CERTIFICATE OF CORRECTION

| | | |
|---|---|---|
| PATENT NO. | : 8,684,801 B2 | Page 1 of 1 |
| APPLICATION NO. | : 12/609249 | |
| DATED | : April 1, 2014 | |
| INVENTOR(S) | : Eugene G. Sukup | |

It is certified that error appears in the above-identified patent and that said Letters Patent is hereby corrected as shown below:

In the Claims

Column 3, line 41, after the word "upward" insert the words --and outward--.

Signed and Sealed this
Eighth Day of July, 2014

Michelle K. Lee
*Deputy Director of the United States Patent and Trademark Office*